US010965476B2

(12) United States Patent
Radermacher et al.

(10) Patent No.: US 10,965,476 B2
(45) Date of Patent: Mar. 30, 2021

(54) POWERED DEVICE, POWER SOURCING EQUIPMENT DEVICE, POWER-OVER-ETHERNET NETWORK SYSTEM, AND METHODS, FOR TRANSMITTING INFORMATION THROUGH CLASSIFICATION SIGNALS

(71) Applicant: SIGNIFY HOLDING B.V., Eindhoven (NL)

(72) Inventors: Harald Josef Günther Radermacher, Aachen (DE); Matthias Wendt, Würselen (DE); Lennart Yseboodt, Retie (BE); Dave Willem Van Goor, Nederweert Eind (NL)

(73) Assignee: SIGNIFY HOLDING B.V., Eindhoven (NL)

(*) Notice: Subject to any disclaimer, the term of this patent is extended or adjusted under 35 U.S.C. 154(b) by 340 days.

(21) Appl. No.: 15/548,941

(22) PCT Filed: Jan. 26, 2016

(86) PCT No.: PCT/EP2016/051508
§ 371 (c)(1),
(2) Date: Aug. 4, 2017

(87) PCT Pub. No.: WO2016/124437
PCT Pub. Date: Aug. 11, 2016

(65) Prior Publication Data
US 2018/0019884 A1   Jan. 18, 2018

(30) Foreign Application Priority Data
Feb. 4, 2015   (EP) .................................. 15153741

(51) Int. Cl.
*H04L 29/00*       (2006.01)
*H04L 12/10*       (2006.01)
(Continued)

(52) U.S. Cl.
CPC .......... *H04L 12/10* (2013.01); *H04L 12/2807* (2013.01); *H04L 12/40045* (2013.01); *H04L 29/00* (2013.01)

(58) Field of Classification Search
CPC ............................... H01L 12/10; H01L 29/00
(Continued)

(56) References Cited
U.S. PATENT DOCUMENTS
7,587,289 B1    9/2009 Sivertsen
2006/0168459 A1  7/2006 Dwelley et al.
(Continued)

Primary Examiner — Adi Amrany
(74) Attorney, Agent, or Firm — Meenakshy Chakravorty

(57) ABSTRACT

The present invention relates to Power-over-Ethernet (PoE) systems. The invention proposes to use a classification event to communicate from the PD (121) to the PSE (110, 910). A sensor (310, 410, 510*a*, 510*b*) may determine a sensor value, shut down the PoE connection, and reconnect so that the power up cycle with the PSE (110, 910) will start. The sensor (310, 410, 510*a*, 510*b*) provides a PoE resistance related to a class 0, 3 where the class relates to the sensor value (e.g., class 0=presence detected; class 1=no presence detected). This procedure may be repeated (e.g. continuously, every minute or whenever the sensor value changes such that the PSE (110, 910) needs to be informed) and if needed multiple cycles can be used to increase the length of the message communicated.

14 Claims, 8 Drawing Sheets

(51) Int. Cl.
*H04L 12/28* (2006.01)
*H04L 12/40* (2006.01)

(58) Field of Classification Search
USPC .............................................. 307/1
See application file for complete search history.

(56) References Cited

U.S. PATENT DOCUMENTS

| | | | |
|---|---|---|---|
| 2007/0041387 A1* | 2/2007 | Ghoshal | H04L 12/10 370/395.52 |
| 2007/0110360 A1 | 5/2007 | Stanford | |
| 2009/0027033 A1* | 1/2009 | Diab | G01K 13/00 323/318 |
| 2010/0117808 A1* | 5/2010 | Karam | H04L 12/10 713/300 |
| 2012/0271477 A1 | 10/2012 | Okubo et al. | |

\* cited by examiner

POWERED DEVICE, POWER SOURCING EQUIPMENT DEVICE, POWER-OVER-ETHERNET NETWORK SYSTEM, AND METHODS, FOR TRANSMITTING INFORMATION THROUGH CLASSIFICATION SIGNALS

CROSS-REFERENCE TO PRIOR APPLICATIONS

This application is the U.S. National Phase application under 35 U.S.C. § 371 of International Application No. PCT/EP2016/051508, filed on Jan. 26, 2016, which claims the benefit of European Patent Application No. 15153741.2, filed on Feb. 4, 2015. These applications are hereby incorporated by reference herein.

FIELD OF THE INVENTION

The invention relates to a powered device for receiving power via a communication link, a power sourcing equipment device for supplying power via a communication link, a Power-over-Ethernet network system, a method of operating a powered device for receiving power via a communication link, a method of operating a power sourcing equipment device for supplying power via a communication link, a method of operating a Power-over-Ethernet network system, and a computer program for operating a powered device for receiving power via a communication link.

BACKGROUND OF THE INVENTION

Power-over-Ethernet (PoE) is described in IEEE Standard 802.3af-2003, Part 3: Carrier Sense Multiple Access with Collision Detection (CSMA/CD) Access Method and Physical Layer Specifications, Amendment: Data Terminal Equipment (DTE) Power via Media Dependent Interface (MDI); IEEE Computer Society. By means of PoE, power is supplied to detached data equipment and peripherals (like routers, switches, printer spoolers etc.) through the same wire or network connection that is already used to connect these to the Ethernet. There are plans to make use of the same standard for all kinds of low power loads such as, e.g., lighting equipment (sensors, switches, light sources etc.) or entertainment appliances like active speakers, internet radios, DVD players, set-top boxes and even TV sets. Standardization in IEEE Standard 802.3 is proceeding to support power levels of, e.g., up to 100 W per Cat5/6 connection.

As PoE supply systems for power distribution inside buildings come into the focus of the industry, some specific usage aspects of these networks need to be solved in order to get these direct current powered networks (so called "DC-Grids") widely employed. Historically, when the PoE standard was introduced for supplying power to detached networking devices like routers, switches, printer spoolers, etc., it was a replacement for small power-plug type power supplies, since the originally intended loads where mostly already equipped with communication and processing means.

As indicated above, an example of powered devices may be light sources, but also sensors or actuators. Typically, two links between power sourcing equipment (PSE) and powered device (PD) are foreseen. A power delivery link is established after detection and classification. Subsequently, a data link is established for the traditional Ethernet data. Both links share some components (like a transformer), but each component also has a significant number of extra components. For a high power, fully controlled light source with monitoring functions, it may be acceptable to spend that effort. Also, for the original target application of PoE, such as IP phones or IP cameras, this is required and reasonable.

In the new application field of lighting systems or similar load systems with often small loads with low local computing and communication requirements however, sometimes the overhead of communication and processing compared to the load complexity is inappropriate. The effort for the communication link may thus be too high for simple detectors (like an ambient light sensor) or lamps, in view of the actual usage of the data link. This is particularly so when components capable of transmitting data rates of 10 MB/s to 1000 MB/s are installed, where only very few status bits are required.

There is thus a need for a PD with inexpensive data communication capabilities.

US 2006/0168459 A1 discloses a circuitry and methodology for providing data communication between a power supply device and a powered device in a system for supplying power over a communication link. The power supply device, such a device for supplying power over Ethernet, receives from the powered device detection information for detecting the powered device and classification information for determining a power level of the powered device. Information circuitry may be provided for handling information presented by the powered device in addition to the detection and classification information.

US 2007/110360 A1 discloses a system and methodology for supplying power to a powered device (PD) over a communication link, such as an Ethernet link. The system has a power supply device that provides power to the PD, and a dynamic power allocation mechanism that dynamically modifies power allocated to the PD in accordance with tasks of the PD.

U.S. Pat. No. 7,587,289 B1 discloses a sensor fixture that can be affixed within a wall and powered using the same cable along which data signals are transmitted. A data cable is attached to the fixture, and power for a sensor is isolated from the data signals. The sensor may be used in conjunction with a building automation system in order to provide environmental inputs, such as from a motion sensor, a light sensor, and an audio sensor. The sensor may also be combined with LED lights for a combined fixture that lights when sensing motion or other environmental changes, for example.

SUMMARY OF THE INVENTION

It is an object of the present invention to provide an improved powered device for receiving power via a communication link, an improved power sourcing equipment device for supplying power via a communication link, an improved Power-over-Ethernet network system, an improved method of operating a powered device for receiving power via a communication link, an improved method of operating a power sourcing equipment device for supplying power via a communication link, an improved method of operating a Power-over-Ethernet network system, and an improved computer program for operating a powered device for receiving power via a communication link.

In an aspect of the invention, there is provided a powered device for receiving power via a communication link, said powered device comprising: a classification information providing unit that is configured to provide a classification information to said communication link during a classification phase of said powered device; a sensor information providing unit that is configured to provide a sensor information to said classification information providing unit; wherein said classification information providing unit is configured to provide said classification information based on said sensor information.

Herein, the term "power sourcing equipment" (PSE) may, e.g., refer to a DTE or midspan device that provides the power to a single link section (i.e., the portion of the link from the PSE to the PD). The term "powered device" (PD) generally refers to a device that is either drawing power or requesting power from a PSE. In a simple example, a communication link as used herein may be an Ethernet cable coupling PSE and PD to each other.

A PSE may be configured to classify a PD to allow features such as load management to be implemented. A successful classification of a PD requires: a) Successful PD detection, and subsequently, b) Successful PD classification. Conventional PDs provide information that allows a PSE to classify their power requirements. The information sent by the PD during a classification cycle is referred to as "classification information" herein. The element of a PD providing the classification information is referred to as a classification information providing unit.

A "classification phase" refers to a time period after detection of a PD, where the PD may communicate its class information to the PSE. In accordance with the present invention, the PD may communicate a class information that does not refer to the PD's power requirements, but that relates to other information. Specifically, the information may relate to information from a sensor, denoted "sensor information" herein. That information is provided from a sensor information providing unit. In a simple example, the sensor information providing unit may be the sensor itself.

An embodiment with a fully PoE-compatible behavior involves a PD comprising sensor (such as, e.g., a movement detector (e.g., PIR-based)), which classifies that no movement is detected by providing a class information corresponding to the lowest class and which classifies that movement is detected by providing a class information corresponding to a higher class. The power to run the PIR and to obtain movement/presence information may be contained in a battery or a rechargeable energy storage in the sensor. The PD comprising the sensor may be done in a way that it only takes power from the PSE for short times to recharge this battery or rechargeable energy storage and then goes under the minimal power signature value (MPS) current. As a consequence, the PD will get switched off by the PSE and a next negotiation cycle will start. This also guarantees that regularly the PSE will request the class which contains information with regard to motion or no motion. Firmware in a correspondingly modified PSE or software in a controlling superordinate system can be used to make use of this information and to, e.g., activate lamps in the vicinity of the sensor whenever motion is detected.

In an embodiment, said powered device further comprises a current control unit that is configured to control a current drawn by said powered device during said classification phase. In an example, said current control unit may be a current control path, but other realizations are conceivable (such as, e.g., an adjustable resistor, or the like). By controlling a current drawn by the PD during the classification phase, it is possible to vary the classification information (also referred to as "classification signature") from one classification cycle to the next.

In a further embodiment, said classification information providing unit is further configured to provide said classification information during said classification phase based on a power level of said powered device; and, in a first mode, said classification information providing unit provides said classification information during said classification phase based on a power level of said powered device; and, in a second mode, said classification information providing unit provides said classification information during said classification phase based on said sensor information. In an example, said first mode corresponds to a default mode, where the PD operates by providing a static (i.e., not variable) class information. Typically, the static class information would correspond to the PD's power requirements. The first mode may also be referred to as static-class mode. The second mode may correspond to an actual communication mode, where the PD communicates sensor information to the PSE. In the second mode, the PD operates by providing a dynamic (i.e., potentially changing from one classification cycle to the next) class information. Specifically, the sensor information may be translated into the dynamic class information. The second mode may also be referred to as dynamic-class mode.

In a further embodiment, in said first mode, said classification information providing unit provides said classification information based on a predetermined power level of said powered device. The predetermined power level may be a "nominal" (medium) power level, i.e., a power level that the sensor will consume over time for performing its measurement. From that level, it can change its class information into either direction (higher and lower) to indicate the sensing event.

In a further embodiment, in said first mode, said classification information providing unit provides said classification information based on a maximum power level of said powered device.

In a further embodiment, said powered device is configured to operate in said first mode during a first classification phase corresponding to a first startup of said powered device. In particular, there may be a learning phase (e.g., during a commissioning phase) setup mode, during which, e.g., an identifier and type of the PD is read out by the PSE. During the learning phase, e.g., by a software-controlled power down, a sequence of classification cycles may be performed. To this extent, there may be multiple "first startups" before entering a phase of "second startups", where the classification information is based on sensor information. Put differently, the embodiment proposes using the fact that many sensors do not need a lot of power so that the sensor simply steps up in class to provide additional information to the PSE. For instance, a PD may require 5 W and would hence normally classify in class 2. By indicating a higher class, the PD may indicate additional information to the PSE.

In a further embodiment, said powered device is configured to operate in said second mode during a second classification phase corresponding to a second startup of said powered device that is subsequent to said first startup. It is assumed that the PD remains plugged-in (i.e., coupled to the PSE) between first and second startup.

In a further embodiment, said communication link corresponds to an Ethernet connection.

In a further embodiment, said sensor information is based on at least one of a lifetime of a component of said powered device, a presence detector output, an ambient light sensor output, a temperature sensor output, and/or a powered device identification information.

In a further embodiment, said powered device further comprises a memory unit that is configured to store said sensor information and a bit position information, wherein said bit position information comprises information on a bit position within a data frame. In a further embodiment, said memory unit comprises a non-volatile memory. In a further embodiment, said memory unit comprises a buffered volatile memory.

In a further aspect of the invention, there is provided a power sourcing equipment device for supplying power via a communication link, said power sourcing equipment device comprising: a classification information receiving unit that is configured to receive a classification information via said communication link during a classification phase; and a sensor information retrieving unit that is configured to retrieve a sensor information from said classification information. In a simple example, said classification information receiving unit may be an input port of the PSE. By means of the sensor information retrieving unit, the PSE is enabled to receive sensor information from a PD via the class information that is provided by the PD after detection. As explained herein, a complicated data interface at the PD side (and/or at the PSE side) may be avoided.

In a further embodiment, said power sourcing equipment device is configured to adjust the amount of power supplied via said communication link based on said sensor information. In an example, a PD may communicate its lifetime to the PSE, where a PD's power needs change toward the end of its lifetime. Upon detecting a lifetime above a predetermined value, the PSE may increase the power provided to the PD. For instance, if the PD is a lamp, the present invention thereby ensures that the lamp's brightness remains constant even toward the lamp's end of life.

In a further embodiment, said power sourcing equipment device is configured to selectively enable said sensor information retrieving unit if said power sourcing equipment device detects a varying classification information over time. Specifically, in the embodiment, the classification information varies over classification events. If things change during a number of events, these events happening in a time sequence, then there is also a change over time. It is noted that the time period between a first and a second classification event may differ from the time period between a third and a fourth classification event. It is further noted that the PSE may take the time as an extra criteria by considering, e.g., the rate of change of the classification information. That is, a fast change of classification information may signal the need to measure more often. In a similar manner, the rate of change may also signal a level of urgency to the PSE. By being able to communicate sensor information encapsulated in the class signature, the PD is configured to change a class information from one classification cycle to the next. The PSE in turn may be configured to detect that a class information has changed, even though the PD has remained coupled to the communication link. That way, the PSE may identify a communication-enabled PD that is configured to communicate sensor information embedded in the class information. Consequently, the PSE may enable the sensor information retrieving unit only if a communication-enabled PD is present.

In a further aspect of the invention, there is provided a Power-over-Ethernet network system comprising: a power sourcing equipment device in accordance with the present invention; a powered device in accordance with the present invention; and a communication link coupling said power sourcing equipment device with said powered device.

In a further aspect of the invention, there is provided a method of operating a powered device for receiving power via a communication link, said method comprising: providing a classification information to said communication link during a classification phase of said powered device; providing a sensor information to said classification information providing unit; wherein, in a sensor mode, said classification information is based on said sensor information.

In a further aspect of the invention, there is provided a method of operating a power sourcing equipment device for supplying power via a communication link, said method comprising: receiving a classification information via said communication link during a classification phase; retrieving a sensor information from said classification information.

In a further aspect of the invention, there is provided a method of operating a Power-over-Ethernet network system in accordance with the present invention, said method comprising: providing a sensor information on said powered device; transmitting a classification information from said powered device to said power sourcing equipment device via said communication link during a classification phase of said powered device; wherein, in a sensor mode, said classification information is based on said sensor information; retrieving said sensor information from said classification information at said power sourcing equipment.

In a further aspect of the invention, there is provided a computer program for operating a powered device for receiving power via a communication link, the computer program comprising program code means for causing the powered device in accordance with the present invention to carry out the steps of the method of operating a powered device in accordance with the present invention, when the computer program is run on a computer controlling the powered device.

It shall be understood that the powered device of claim 1, the power sourcing equipment device of claim 8, the Power-over-Ethernet network system of claim 11, the method of operating a powered device of claim 12, the method of operating a power sourcing equipment device of claim 13, the method of operating a Power-over-Ethernet network system of claim 14, and the computer program for operating a powered device of claim 15 have similar and/or identical preferred embodiments as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1A:
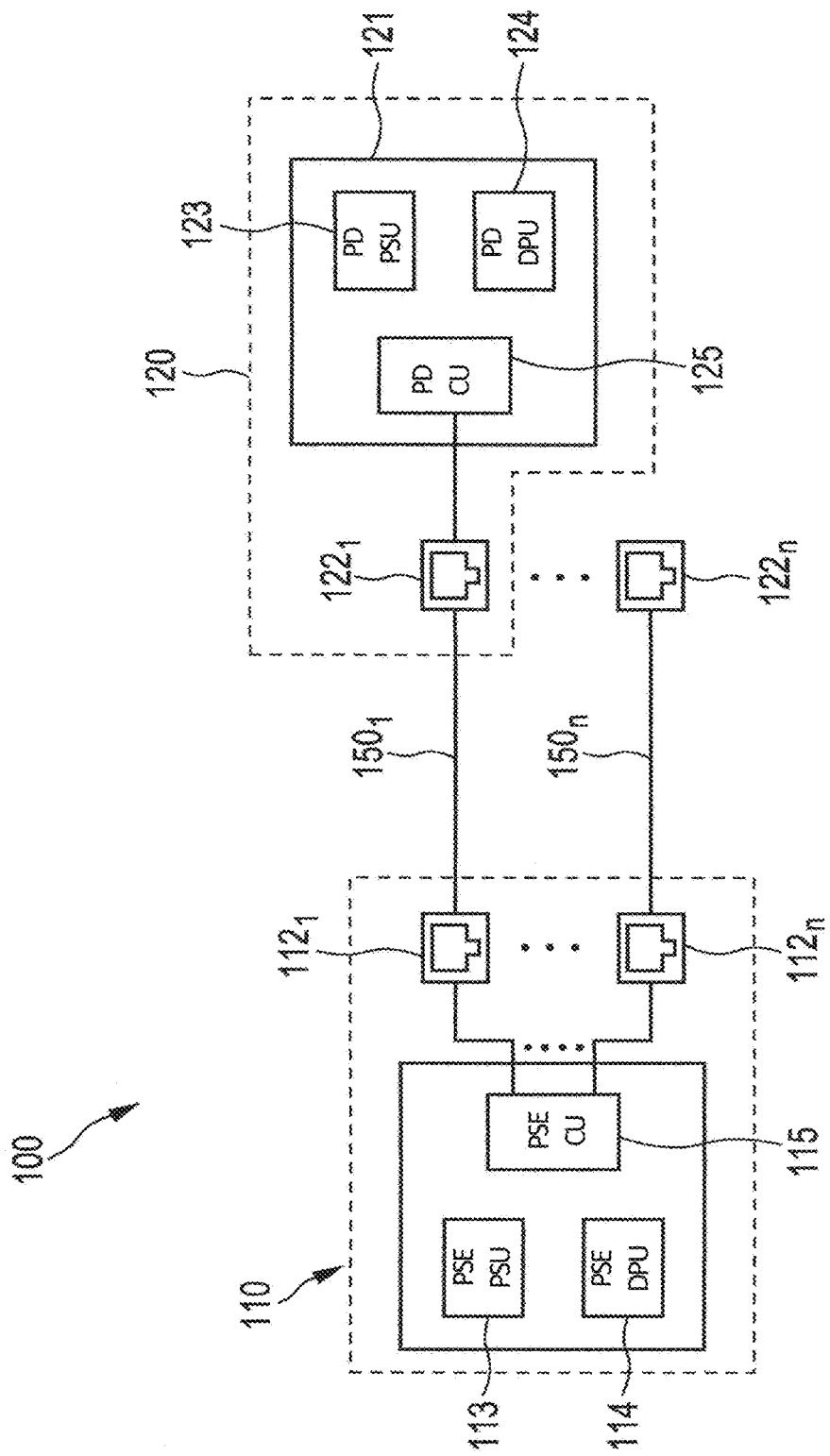
FIG. 1A shows a typical layout of a PoE system.

FIG. 1A shows a typical layout of a PoE system 100 comprising a power sourcing equipment (PSE) 110 and a PoE load 120 comprising a powered device (PD) 121. A PoE connection may be implemented by means of a so called patch cable $150_1, \ldots, 150_n$ between one of a plurality of output jacks or ports $112_1, \ldots, 112_n$ of the PSE 110 and an input jack or port $122_1, \ldots, 122_n$ of the PD 121. In Pot systems, typically PSE power supply unit (PSU) 113 and PD power supply unit (PSU) 123 as well as PSE data processing unit (DPU) 114 and PD data processing unit (DPU) 124 share the same PoE connection $150_1, \ldots, 150_n$. In multi-load systems, each load is connected to a separate one of the plurality of output ports comprising a first port $112_1$ to an n-th port $112_n$ of PSE 110, while PSE control unit (CU) 115 is configured to control the correct powering. Thus, each load, such as PD 121, indicates separately the suitability for receiving power over the Ethernet connection and negotiates separately the availability of required power with PSE 110. This requires a PD control unit (CU) 125 in each PD 121. On the side of PSE 110, PSE control unit 115 supervises the negotiations on all ports.

In accordance with IEEE standard 802.3af, a PD may be classified by the PSE based on the classification information provided by the PD. By classifying a PD, it is intended to inform the PSE about the maximum power required by the PD during operation. Class 0 is the default for PDs. Classes 1 to 3 may be used for alternative power management scenarios at the PSE. Classification of a PD is based on power. The classification of the PD is the maximum power that the PD will draw across all input voltages and operational modes. A PD returns Class 0 to 3 in accordance with the maximum power draw. Specifically, the standard requires that the PD presents one, and only one, classification signature during classification. Consequently, in the original idea of PoE, this classification data is used for power budgeting proposes of the PSE.

The following table lists PD power classifications and classification signatures (i.e., classification currents), measured at a PD input connector:

| Class | Power | Classification current |
|---|---|---|
| 0 | 0.44 to 12.96 W | 0 to 4 mA |
| 1 | 0.44 to 3.84 W | 9 to 12 mA |
| 2 | 3.84 to 6.49 W | 17 to 20 mA |
| 3 | 6.49 to 12.95 W | 26 to 30 mA |

After a powering phase, a new detection and classification event is initiated. One reason for this is that the PoE connection (e.g., patch cable) may have been disconnected from the PD and will be connected to an Ethernet port of a non-PoE-compatible device. By initiating a new detection and classification event, application of high voltage to a non-PoE device is avoided by the measurement of a minimum current.

Herein, the possibilities of PoE in terms of providing data during classification and terminating/reinitiating the connection are used to set up a low-data-rate communication. To this extent, information contained in the classification for a low-data-rate communication via the PoE-link is used. Accordingly, an extra data link or alternative power line communication circuitry can be avoided.

Figure 1B:
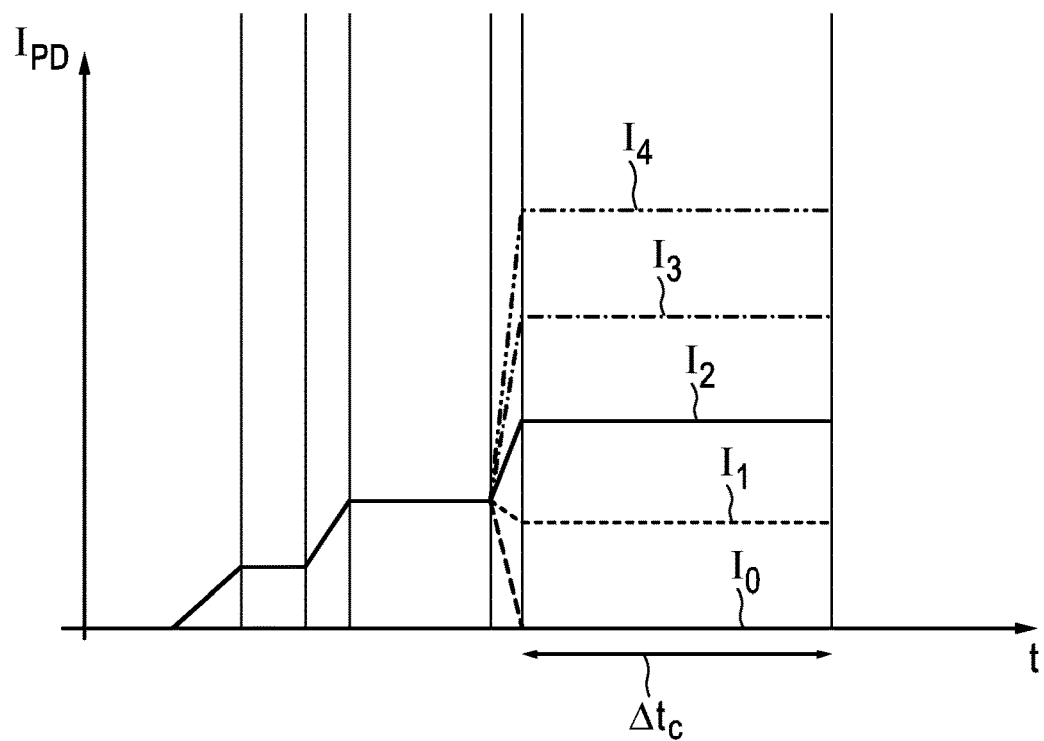
FIGS. 1B and 1C show the principle current and voltage waveforms of a powered device.
Figure 1C:
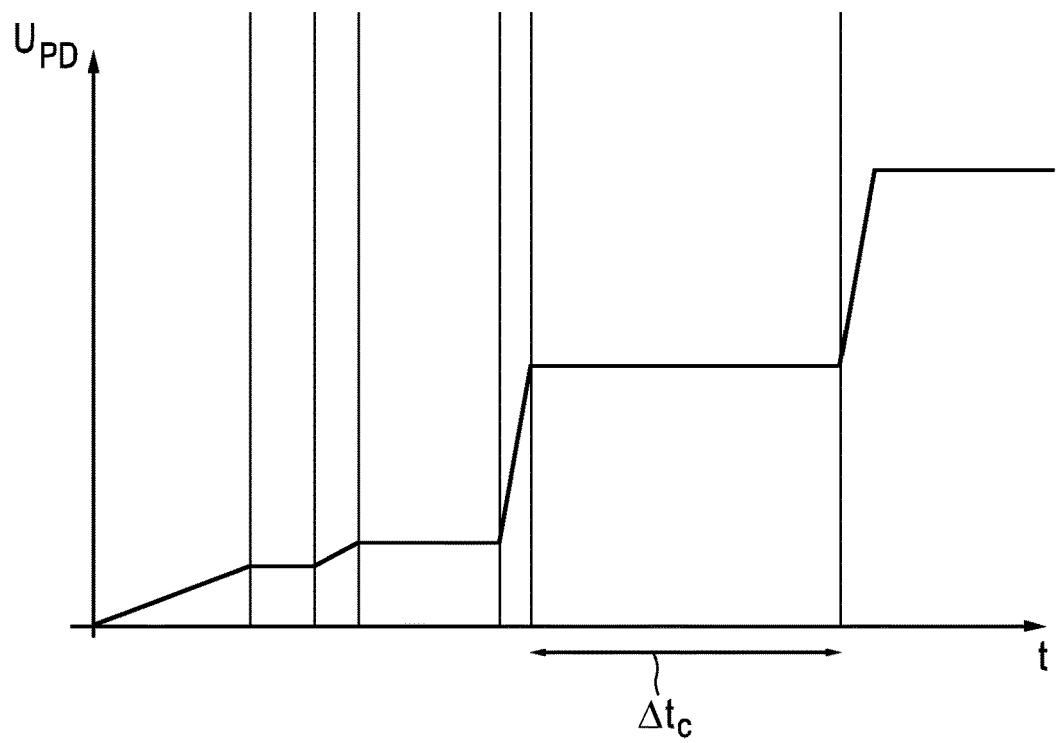

FIGS. 1B and 1C show the principle current and voltage waveforms $I_{PD}$, $U_{PD}$ of a powered device. If the voltage drop in the patch cable can be neglected, these waveforms are expected to be the same at the PD end and at the PSE end. Given that the PSE is initiating the detection and classification, one typically considers the waveforms as observed at the PSE side.

During the classification phase $\Delta t_c$ in FIGS. 1B and 1C, PD 121 will present a class to PSE 110. In accordance with an embodiment of the present invention, the selection of the class is not predominantly determined by the power rating of PD 121, but instead PD 121 captures certain information (via a sensor, from memory, etc.) and selects the class according to the information. Setting a class is achieved by means of a current control unit, which controls the current $I_0, \ldots, I_4$ drawn by PD 121 during the classification phase $\Delta t_c$. Since IEEE standard 802.3af only foresees only four class levels, current waveform $I_4$ represents a non-standard conform current above the maximum value of 30 mA. In principle, also non-compliant class currents may be used to signal information to the PSE. It is further noted that standards are of course evolving over time, and new levels, steps, timings, sequences, etc. may be used to indicate further classes in the future.

Figure 2:
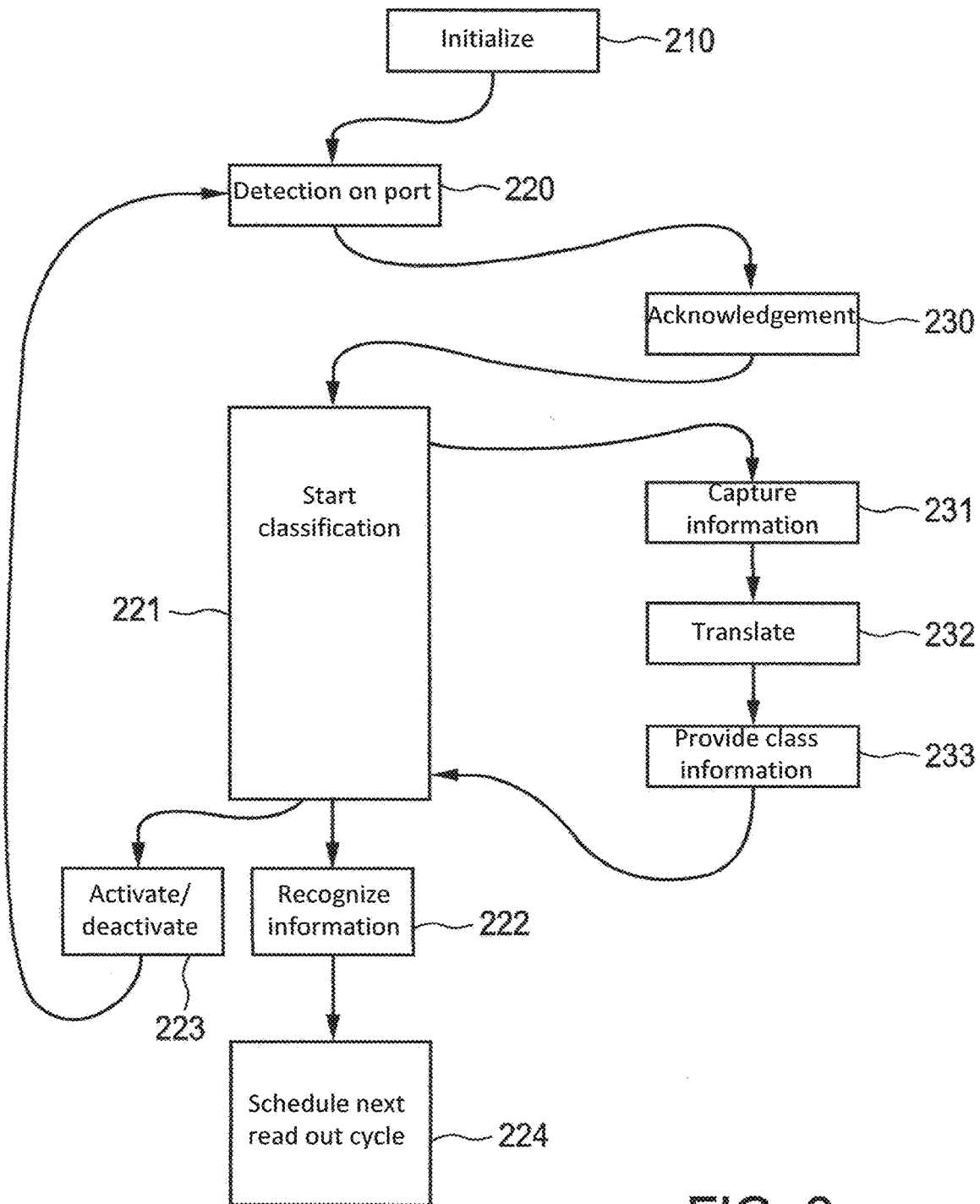
FIG. 2 shows a flow chart representing the interaction of PSE and PD.

FIG. 2 shows a flow chart representing the interaction of PSE 110 and PD 121. More specifically, there is shown a flow chart of operation in a first application. Here, only one measurement result is communicated to PSE 110 during each classification cycle $\Delta t_c$.

The method initializes at step 210. At any point in time, PSE 110 will start detection on a specific port (step 220). The PD connected to that port (e.g., PD 121), acknowledges with the presentation of the specified detection resistor (step 230). Next, PSE 110 starts the classification (step 221). PD 121 can use the energy, available from the classification signal $I_0, \ldots, I_3$, to power up its internal circuitry and sensor, capture information (temperature, ambient light level, presence, lamp status, switch position, . . . ) (step 231) and translate this into the corresponding classification info (steps 232-233). PSE 121 may be configured to recognize this classification current and hence the class and hence the sensing result (within the rough resolution of the few classes) (step 222). This information can then be used by PSE 110 and other devices or systems. E.g. based on the result, PSE 110 can schedule the next read out cycle at an earlier or later point in time t (step 224). PSE 110 can also make this information available to a light control or building automation system and receive information from that system. Control action can also be realized within the PSE, e.g. another port can be activated or deactivated based on the classification result from that sensor port (step 223).

As explained herein, an aspect of the present invention relates to the transmission of a "modified" classification signature from the PD to the PSE in order to provide an inexpensive communication scheme. To this extent, setting up the entire system may works in the following order: First, a PD is connected to the PSE. Next, a startup of the PD is initiated. Next, the PD presents a classification signature based on the PD's nominal power level. Next, the PD is restarted. Finally, the PD presents a classification signature that is based on the PD's sensor information. That way, the PSE may interpret the very first classification signature in a conventional manner, whereas subsequent classification signatures are interpreted to comprise sensor information from the PD. Put differently, in the above-described embodiment, the PSE is actively asking for the first class code and directly thereafter restarts negotiation to get the status information.

A different mechanism is conceivable in particular for sensors, where the sensing information (e.g., presence or no presence) may change at random times. In this embodiment, a sensor gets detected and classified at a first connection time or at PSE power up just a conventional device. The class information would then correspond to the power the sensor will need for operation. However, when the sensor decides to send its status, it may, e.g., shortly disrupt the minimal power signature value (MPS) and thereby request a new negotiation cycle in which it then presents the status-related class (i.e., the class information corresponding to the sensor information rather than to the PD's power requirements). The PSE may do the bookkeeping in order to detect that a class is changing over time with only a short undercut of the MPS (which indicates that there has not been a manual change of the PD, which might also give a different class). Additionally and/or alternatively, the PD may be configured to intentionally go into over current protection so that the PD will be switched off by the PSE and in turn get renegotiated.

On the side of PSE 110, an adapted firmware can be used, in order to initiate classification cycles at an adjustable rate, for forwarding the detected classification information to a super-ordinate management system or even for pre-processing of the data.

Depending on the complexity of the data and/or the sensing task, simple analogue circuitry inside PD 121 may be sufficient for translating the information into the classification signal to a PD control unit, such as, e.g., a PD controller chip. More complex tasks or data may require a micro controller for generating the information or the data stream. Still, the cost, the physical size (PCB footprint) and the power consumption of the data interface is omitted, resulting in a simple, efficient, low cost solution.

Information, present in a node control unit 315, is prepared in a way to manipulate the classification that is signaled by the PD control unit and/or to terminate the power consumption of the PD. The node controller is configured to receive the sensor information and to translate the sensor information such that a class signature, presented to the $R_{class}$ and $V_{in}$ pins of PD controller chip 330, is respectively modified. Further, the node controller also decides upon restarting the PD. In an embodiment, the node controller is therefore also coupled to the shutdown pin of the PD controller chip. Put differently, the restart function needs also to be triggered by the node controller which is the entity knowing about this mechanism on the PD side. In a system using the same mechanism but by restarting cyclic negotiations as triggered by the PSE, such a connection can be omitted and the node controller only monitors the PD voltage in order to see that a new negotiation cycle has been started.

Figure 3:
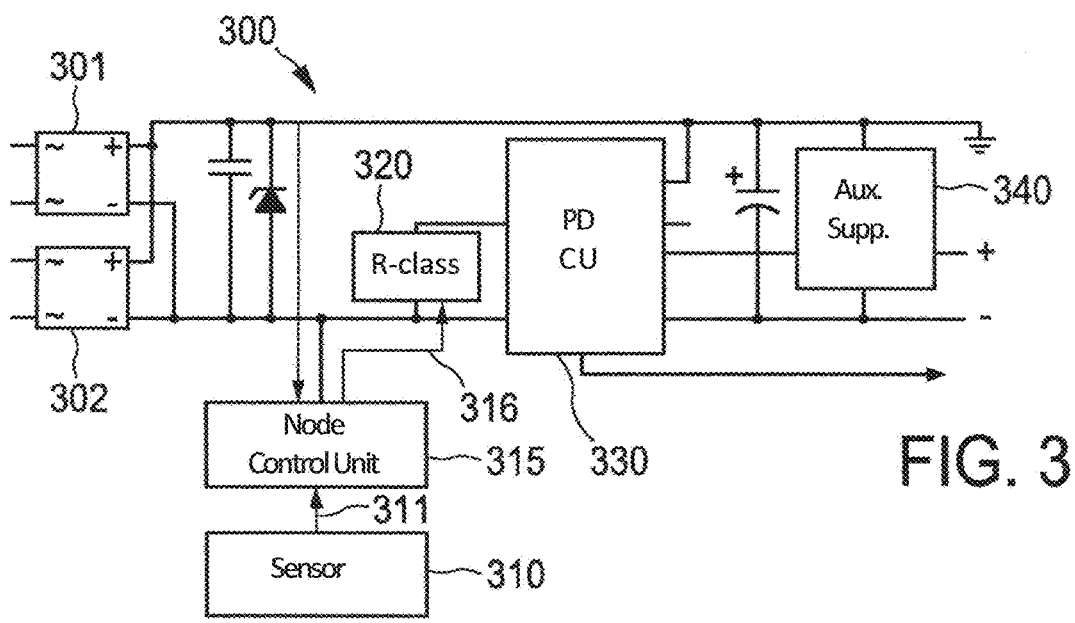
FIG. 3 shows schematically and exemplarily an embodiment of a powered device.

For one exemplary PD control unit, this is depicted in FIG. 3, which shows schematically and exemplarily an embodiment of a PD 300, wherein a sensor signal 311 is provided from a sensor 310 to a node control unit 315, which translates the sensor signal into a command 316 for an adjustable R-class unit 320. In the present embodiment, adjustable R-class unit 320 may be coupled between an $R_{class}$ pin and a $V_{in}$ pin of PD control unit 330. The loading of pins $R_{class}$ and $V_{in}$ may then be used by PD control unit 330 during classification. Node control unit 315 may also be configured to monitor the input voltage. In additional, further sensors and control signals might be present. PD 300 further comprises line rectifiers 301, 302. PD 300 further comprises unit 340 comprising an auxiliary supply (Aux. Supp.) and an optional load.

PSE 110 is configured to capture the classification information. At any rate, PSE 110 is able to read that information for its internal power budgeting purposes. Hence, no extra hardware or software effort is required on the PSE side. In an embodiment, further logic may be present on the PSE to correctly interpret the modified classification signal. In a typical embodiment, the PSE would thus need to understand the class code as corresponding to additional information rather than a mere power budgeting indication. Conventional PSEs may however still be able to operate with a PD in accordance with the present invention without any error as long as the requested class power is available in the PSE budget and the PD can be supplied with the related power value. In an embodiment, monitoring the negotiations from outside the PSE may be possible, so that the class information is interpreted correctly. For instance, a computer may use the management port of a PSE to read the classes currently negotiated at the different ports. In this embodiment, a conventional PSE could be used, where the PD would actively request the renegotiation in order to send the modified class information.

For a PoE system 100 foreseeing only four classes, only a limited amount of data (namely, two bits) may be incorporated in the classification-cycle (within a few milliseconds).

PSE 110 may be "aware" that the classification is used for communication, but it can also be used with any normal managed switch, where the classification information is made available to a superordinate control system. In that case, PoE system 100 needs to "know" somehow that a certain type or sensor with a certain coding scheme is connected to a port $112_1, \ldots, 112_n$ of PSE 110. Alternatively and/or additionally, varying power class information can be evaluated over a given time period, such that the system is informed about the presence of a certain type of sensor automatically. Namely, whereas conventional powered devices present a constant class signature over time, a PD in accordance with the present invention might vary its class signature in accordance with the sensor output. This variation is indicative of the presence of a PD able to communicate with its class signature.

Figure 4:
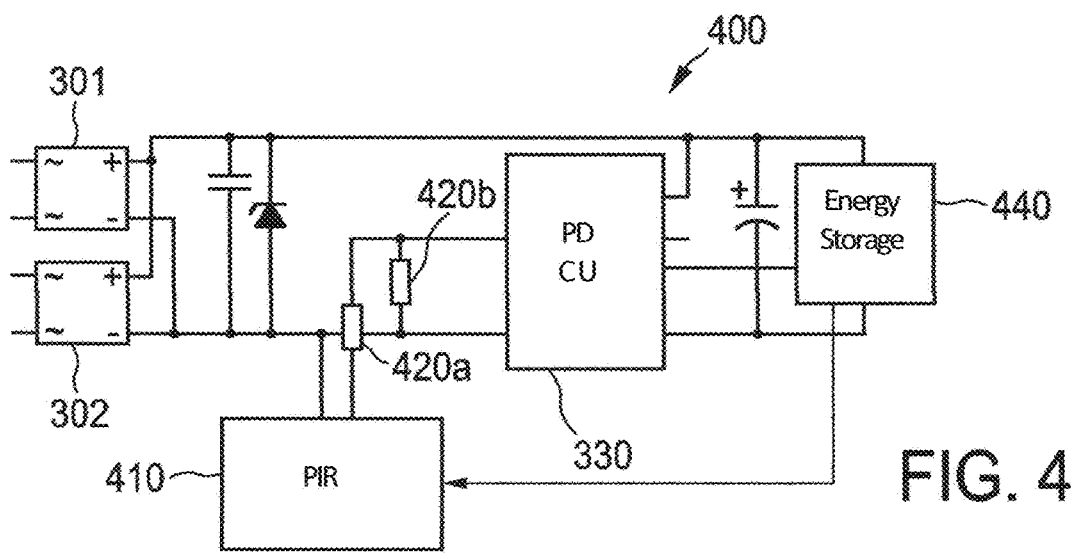
FIG. 4 shows schematically and exemplarily an embodiment of a powered device passive infrared sensor with classification communication.

FIG. 4 shows schematically and exemplarily an embodiment of a powered device (PD) 400 comprising a passive infrared sensor (PIR) 410 with classification communication. When "no presence" and "presence" are to be distinguished, passive-infrared-sensors-(PIR)-detectors are frequently chosen, beneficially having very low power consumption. PD 400 may comprise an energy storage 440 (such as, e.g., a capacitor), which is charged out of the detection/classification/operation voltage. A controlled current path is present to control the actual current drawn by PD 400 during classification. In the example shown in FIG. 4, this may be realized within a commercially available PD control unit, such as, e.g., a PD controller chip that is configured to receive the information on the class via the loading on its pin $R_{Class}$. In the embodiment, this class-information depends on presence information 411 output by PIR 410: A first load 420a to the $R_{Class}$ pin is activated by the presence detection circuitry 410. An optional second loading 420b may set the classification current (and hence the class) for the default state. Other chip controllers may provide the classification signature differently than by employing an $R_{Class}$ pin. In some embodiments, external resistors may be used to set the class. In other embodiments, a programmable interface may be used. In still further embodiments, pins may be used to set the class.

Figure 6:
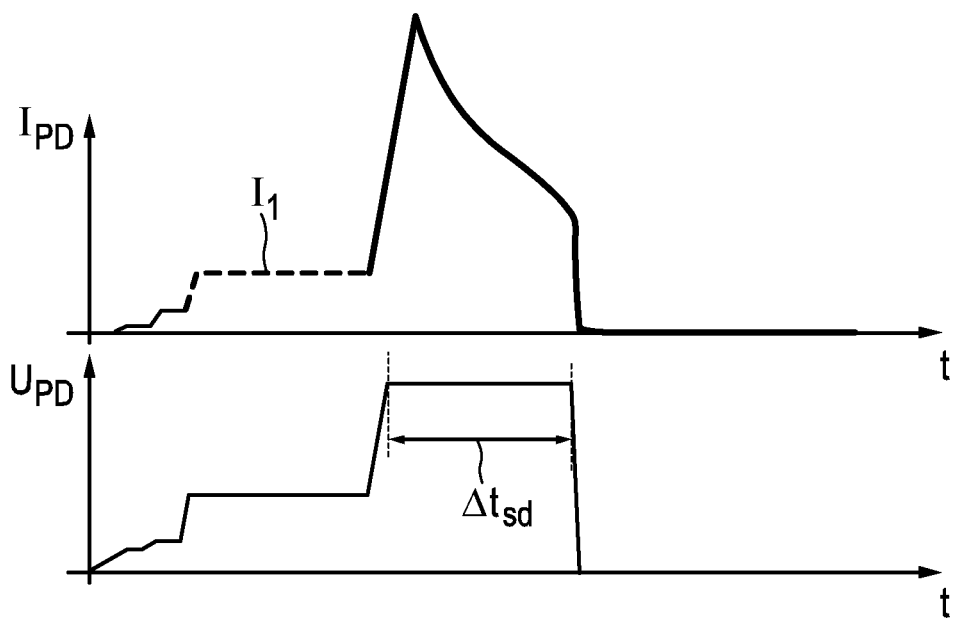
FIGS. 6 and 7 show principle waveforms for the powered device of FIG. 4.
Figure 7:
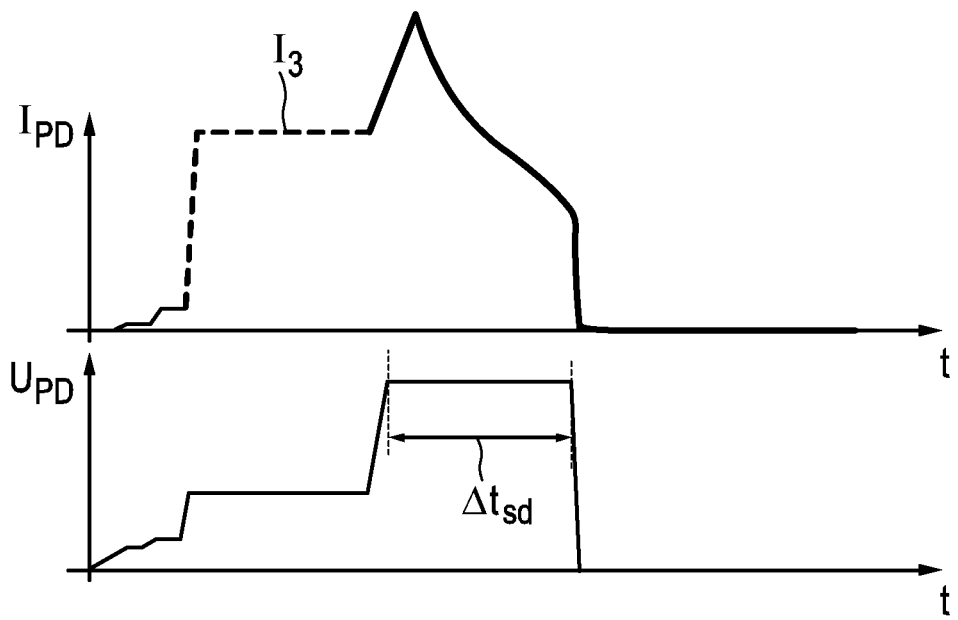

FIGS. 6 and 7 show principle waveforms for PD 400. For simplicity, instantaneous startup of PIR 410 is assumed. In reality, a previous powering cycle will have charged energy storage 440, such that PIR 410 is active, unless the pause between the cycles is too long.

If no presence is detected, as shown in FIG. 6, a first classification current $I_1$ is consumed (in the example, $I_1$ might be indicative of class 1). If presence is detected, as shown in FIG. 7, a second classification current $I_3$ is consumed (in the example, $I_3$ might be indicative of class 3). PSE 110 will identify the first or the second classification current level $I_3$ and will hence know the presence status, as sensed by detector 410.

After "reading" the status from PSE 110, i.e., after the classification phase $\Delta t_c$, PSE 110 may provide power to PD 400 for some time $\Delta t_{sd}$, e.g. to charge the storage element, until a shutdown is initiated.

During the time period where no power is delivered from PSE 110, PD 400 may be powered from energy storage 440. Alternatively, PD 400 may shut down after the supply voltage has dropped below a critical value and will start up with the next cycle. PD 400 may also consume a minimum current in order to keep the PoE link to PSE 110 active.

In a further embodiment, four states (according to four classes, which corresponds to the minimum number of classes in IEEE standard 802.3af) may be used by an ambient light sensor with four different light level classes, e.g. up to 10 lux, 10 to 500 lux, 500 to 550 lux, more than 550 lux. Schedule for termination and starting of new cycles is very much like discussed before, with the difference that a chance of the light level may trigger the events.

Figure 5:
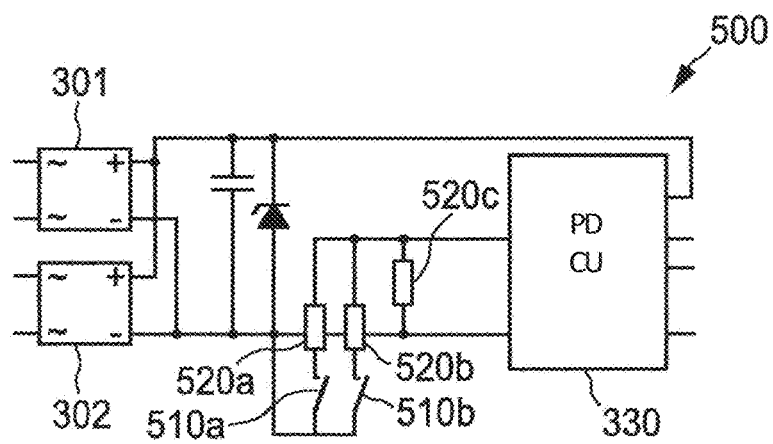
FIG. 5 shows schematically and exemplarily an embodiment of a PD comprising a temperature sensor.

FIG. 5 shows schematically and exemplarily an embodiment of a PD 500 with three states, where PD 500 comprises a temperature sensor. The three different temperature classes may refer to, e.g., up to 20° C., 20° C. to 25° C., more than 25° C. In case temperature sensitive switches 510a (e.g., with a trip point of 25° C.), 510b (e.g., with a trip point of 20° C.) are used (see FIG. 5), they can directly be coupled with the $R_{Class}$ input of PD control unit 330 via resistance units 520a, 520b, 520c as shown in FIG. 5. In the simplest case, resistance units 520a, 520b, 520c are fixed resistors. Depending on the active switch(es), a certain number or resistance units 520a or 520b will effectively load the $R_{Class}$ signal, resulting in a correspondingly modified classification current. This embodiment may provide immediate start up.

With some limitation on the compatibility, also a negative temperature coefficient (NTC) thermistor/positive temperature coefficient (PTC) thermistor could directly be used as $R_{Class}$. It is noted that, since the standard allows current ranges specified for the different classes, also a normal themosensitive resistor may be used. No change to the PD controller chip is necessary for that purpose, because, as every current value (i.e., class information) is allowed, the current value will have a certain interpretation. On the one hand, employing an NTC/PTC however results in classification current values outside the allowed non-overlapping classes, which might not be accepted by some PSEs. On the other hand, by using a specifically-tailored PSE (e.g., with a respective firmware), the communication scheme proposed herein would even allow for a quasi-continuous temperature measurement.

It is noted that, decoupled from the sensing part, the present invention can also be used in combination with light sources, or other loads. To this extent, in a further embodiment, a lamp close to its end of life may need to increase its input power, in order to deliver a constant light output. Hence, the lamp may choose a higher power class at a certain point in time. The PSE will detect this, and a superordinate management system can notice the increase power demand of the load and hence derive the information, that maintenance/repair of the load of required. The superordinate management system typically corresponds to an intelligent control system handling, e.g., all the lamps, the maintenance, the building, etc. To this extent, the superordinate management system may be a supervising control system, which has access to the PSE information and which may be configured to act in response thereto.

In a further embodiment, more complex data may be packed into a data frame and transmitted during multiple cycles.

Example for more complex data may be identification or status information of a lamp, such as, e.g., identifier, calibration data, heat sink temperature, operation hours. During each powering-up, the load may send one or two bits of information, which are then decoded according to the data frame structure. It is noted that, depending on the usage of the lamp, a complete frame may take several weeks to be read out (e.g. in case of a lamp that is switched on only once a day). For ageing information (counting towards, e.g., 50000 hours), this delay is acceptable and poses no relevant limitation.

Typically, an embodiment of a powered device in accordance with the present invention would only use the actual and higher power classes (but no class indicating a lower power), in order to avoid impacting the power budgeting of the PSE. It is noted that, if a PD is using the highest class in terms of its power requirement, it can only make use of underclassing (i.e., signaling a class information corresponding to lower-level classes) to communicate. Such underclassing will however present problems with a conventional PSE, because then the actual power consumption would be above the negotiated power and the PSE would switch off the PD. Thus, when operating a system comprising a PSE not configured to accept varying class information, it is advisable to only use upclassing (i.e., signaling a class information corresponding to higher-level classes) for communication. Indeed most sensors do not need substantial power for operation so that the class information corresponding to the PD's power requirements typically indicates a low-level class. There will thus be sufficient upclassing possibilities to be used for communication under normal circumstances. The class 0 can be used in combination with any other (true) class. E.g. a load with a true power consumption up to 5 W can indicate itself in class 2, but also in class 0. So, class 2 and class 0 can be used as representation of digital bits 0 and 1, and the sequence of classifying as class 0 and class 2 results in a bit stream of 0's and 1's. For this kind of communication, an embodiment of a PD would typically comprise a non-volatile memory for storing both the information (e.g. operation hours) and the bit position within the data frame.

For faster cycle times, multiple classification cycles can be initiated in a fast sequence. In combination with a light source, preferably an extra time slot (e.g. during night, when an office is not occupied) is used for this, such that the multiple classification event will not cause visible artifacts or downtimes.

Multiple classification cycles can, e.g., be used during the commissioning of a PoE system.

Each sensor, lamp, etc. capable of the classification-based communication scheme proposed herein may have an identifier (unique and/or general type) and/or a coding table, and may be configured to automatically send out this data during the first classification events. After that, normal operation (sensor-information-dependent classification) is initiated.

Figure 8:
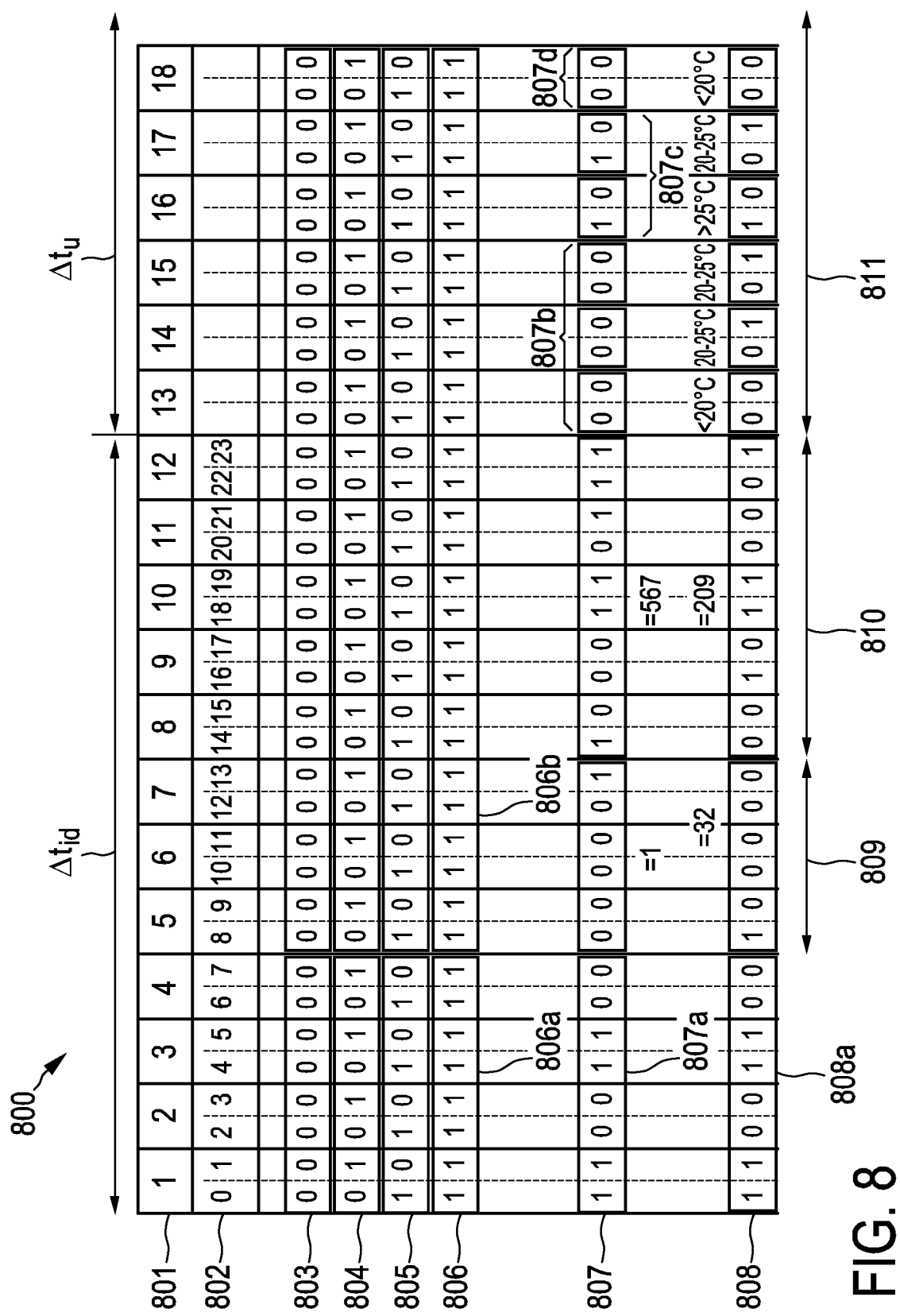
FIG. 8 shows schematically and exemplarily an embodiment of a data frame and identification and sensor data transmission.

FIG. 8 shows schematically and exemplarily an embodiment of a data frame and identification and sensor data transmission. Line 801 shows the number of classification event. Line 802 shows the respective bit (as noted above, for the example of classes 0, . . . 3, two bits can be communicated per classification event). Normal loads will present a static class. This can be seen in lines 803 to 806, where classification signatures transmitted from a normal lamp for classes 0 (line 803), 1 (line 804), 2 (line 805), and 3 (line 806) is demonstrated. A (microcontroller-based) communication-enabled PD can present a class that may be varying from one classification cycle to the next. This concept may be used to detect the presence of such a PD. In the example of FIG. 8, eight bits 806a, 807a, 808a are reserved for this. For the normal lamp (lines 803 to 806), class information remains unchanged from one classification cycle to the next (i.e., the same two bits are repeated over and over). This static class thus notifies the PSE that the device is a no-communication-PD. In contrast to this, for the communication-enabled PDs (lines 807 and 808), class signatures may change from one classification cycle to the next. This dynamic class thus notifies the PSE that the device is a communication-enabled PD.

Following the initial eight bits, there may be six bits 809 for the type of device (e.g. type 1 being a presence detector as shown in line 807, type 32 being a temperature sensor as shown in line 808). Then, there may be ten bits 810 for a (not necessarily globally unique, but preferably PSE-wide unique) identifier of the device (e.g., 567 in line 807 or 209 in line 808). Thus, the first 24 bits (or the first 12 classification events) correspond to an identification phase $\Delta t_{id}$. Following, as of classification event #13, a usage phase $\Delta t_u$ begins and the sensors provide the sensing-value-dependent classification, which may be translated to sensor values by the PSE (or by a superordinate control unit), e.g., based on the knowledge of the PD type. Here, a presence/no-presence sensor (line 807) reports "no presence" during classification cycles 13 to 15 and 18 (see reference signs 807b and 807d) and reports "presence" during classification cycles 16 and 17 (see reference signs 807c). In a similar manner, a temperature sensor (line 808) may report respective temperature ranges "<20° C.", "20-25° C.", or ">25° C.".

It is noted that the "x-axis" of FIG. 8 corresponds to the sequence of classification events and does not necessarily corresponds to a linear time axis.

As long as a PD is used in one PoE system during its entire life and the system logs all the classification results, this will result in consistent interpretation. A reset-procedure may be present to start over with the identification.

The approach to communication presented herein will require compatibility on the PSE side and data processing in the control system. Specifically, PDs in accordance with the present invention may be provided without data communication ICs.

An example application of the present invention is in PoE lighting, HVAC (heating, ventilation and air conditioning) and sensing networks, e.g. in professional buildings. A further application of the present invention relates to simple sensors (presence, ambient light, etc.). A further application of the present invention relates to low standby power, low cost PoE sensors. A further application of the present invention relates to reliable sensors, providing an Ethernet-independent communication channel. A further application of the present invention relates to enabling "dumb" lamps (i.e., lamps without communication means and/or lamps without separate communication and/or lamps with very limited internal control circuitry), which are in fact not absolutely "dumb".

Figure 9:
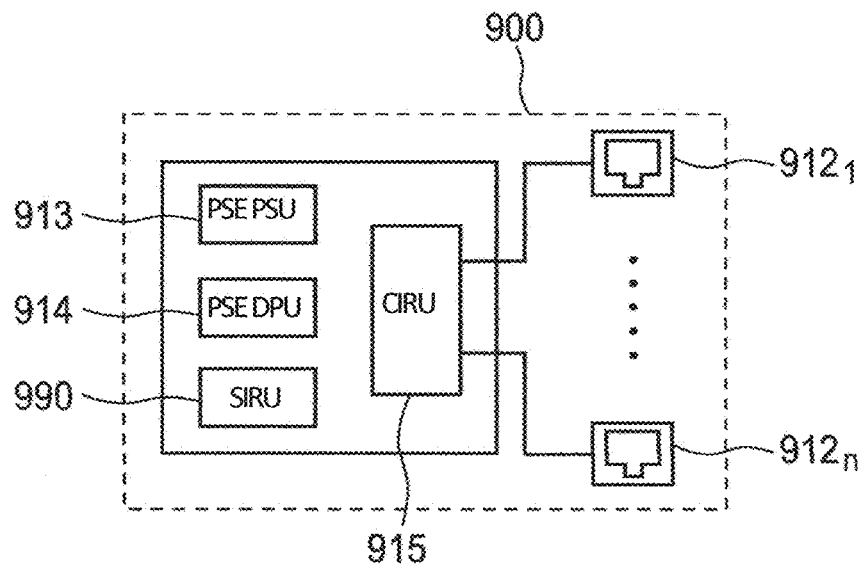
FIG. 9 shows schematically and exemplarily an embodiment of a power sourcing equipment device.

FIG. 9 shows schematically and exemplarily an embodiment of a power sourcing equipment device 910 for supplying power via a communication link $150_1$, . . . , $150_n$. Power sourcing equipment device 910 comprises a classification information receiving unit (CIRU) 915 that is configured to receive a classification information via said communication link $150_1$, . . . , $150_n$ during a classification phase; and a sensor information retrieving unit (SIRU) 990 that is configured to retrieve a sensor information from said classification information.

A PoE connection may be implemented by means of a patch cable $150_1$, . . . , $150_n$ between one of a plurality of output jacks or ports $912_1$, . . . , $912_n$ of the PSE 910 and an input jack or port of the PD. In the example shown, power sourcing equipment device 910 further comprises PSE power supply unit 913 and PSE data processing unit 914. PSE control unit 915 supervises the negotiations on all ports.

Figure 10:
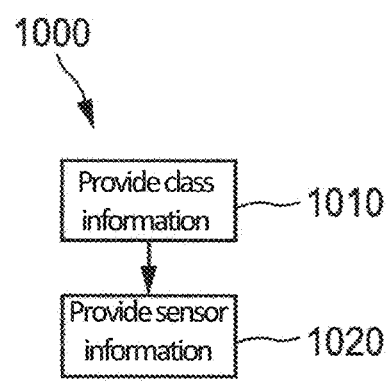
FIG. 10 shows schematically and exemplarily an embodiment of a method of operating a powered device.

FIG. 10 shows schematically and exemplarily an embodiment of a method 1000 of operating a powered device 121 for receiving power via a communication link $150_1$, . . . , $150_n$. Method 1000 comprises a step 1010 of providing a classification information to said communication link $150_1$, . . . , $150_n$ during a classification phase of said powered device 121; a step 1020 of providing a sensor information to said classification information providing unit 330. In a sensor mode, said classification information is based on said sensor information.

Figure 11:
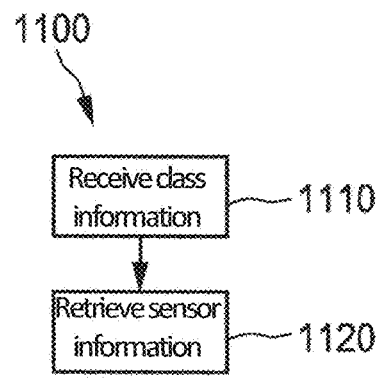
FIG. 11 shows schematically and exemplarily an embodiment of a method of operating a power sourcing equipment device.

FIG. 11 shows schematically and exemplarily an embodiment of a method 1100 of operating a power sourcing equipment device 110, 910 for supplying power via a communication link $150_1$, . . . , $150_n$. Method 1100 comprises a step 1110 of receiving a classification information via said communication link $150_1$, . . . , $150_n$ during a classification phase; and a step 1120 of retrieving a sensor information from said classification information.

Figure 12:
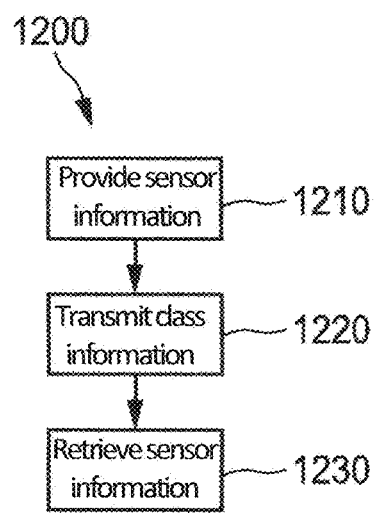
FIG. 12 shows schematically and exemplarily an embodiment of a method 1200 of operating Power-over-Ethernet network system.

FIG. 12 shows schematically and exemplarily an embodiment of a method 1200 of operating Power-over-Ethernet network system 100. Method 1200 comprises a step 1210 of providing a sensor information on said powered device 121; a step 1220 of transmitting a classification information from powered device 121 to power sourcing equipment device 110, 910 via communication link $150_1$, . . . , $150_n$ during a classification phase of powered device 121. In a sensor mode, said classification information is based on said sensor information. Method 1200 further comprises a step 1230 of retrieving said sensor information from said classification information at said power sourcing equipment device 110, 910.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems. The term "computer program" may also refer to embedded software.

Any reference signs in the claims should not be construed as limiting the scope.

The present invention relates to Power-over-Ethernet (PoE) systems. The invention proposes to use a classification event to communicate from the PD to the PSE. A sensor may determine a sensor value, shut down the PoE connection, and reconnect so that the power up cycle with the PSE will start. The sensor provides a PoE resistance related to a class 0, . . . , 3 where the class relates to the sensor value (e.g., class 0=presence detected; class 1=no presence detected). This procedure may be repeated (e.g. continuously, every minute or whenever the sensor value changes such that the PSE needs to be informed) and if needed multiple cycles can be used to increase the length of the message communicated.

The invention claimed is:

1. A powered device for receiving power via a communication link, said powered device comprising:
    a classification information providing unit that is configured to provide a classification signal to said communication link during a classification phase of said powered device, wherein said classification signal denotes a power consumption level of said powered device during the classification phase and is based on a power consumption of the powered device;
    a sensor unit for detecting an ambient condition;
    a sensor information providing unit that is configured to provide sensor information indicating the detected ambient condition to said classification information providing unit;
    wherein said classification information providing unit is configured to provide said classification signal to said communication link based on said sensor information during a second phase, wherein said classification signal denotes the detected ambient condition during the second phase.

2. The powered device as defined in claim 1, wherein said powered device further comprises a current control unit that is configured to control a current drawn by said powered device during said classification phase.

3. The powered device as defined in claim 1, wherein said power consumption of the powered device is a predetermined power consumption of the powered device.

4. The powered device as defined in claim 1, wherein said powered device is configured to operate in said classification phase during a first startup of said powered device.

5. The powered device as defined in claim 4, wherein said powered device is configured to operate in said second phase during a second startup of said powered device that is subsequent to said first startup.

6. The powered device as defined in claim 1, wherein said sensor unit is at least one of a presence detector, an ambient light sensor and/or a temperature sensor.

7. A power sourcing equipment device for supplying power via a communication link to one or more powered devices, said power sourcing equipment device comprising:
    a classification information receiving unit that is configured to receive a classification signal via said communication link from a given powered device of said one or more powered devices during a classification phase, wherein said classification information receiving unit is configured to interpret, during the classification phase, said classification signal as denoting a power consumption level of said given powered device; and
    a sensor information retrieving unit that is configured to receive said classification signal via said communication link from a given powered device during a second phase, wherein said sensor information retrieving unit is configured to interpret, during said second phase, said classification signal as denoting sensor information indicating an ambient condition detected by a sensor of the given powered device.

8. The power sourcing equipment device as defined in claim 7, wherein said power sourcing equipment device is configured to adjust the amount of power supplied via said communication link based on said sensor information.

9. The power sourcing equipment device as defined in claim 7, wherein said power sourcing equipment device is configured to selectively enable said sensor information retrieving unit if said power sourcing equipment device detects a varying classification signal over time.

10. A Power-over-Ethernet network system comprising: said power sourcing equipment device, said given powered device and said communication link of claim 7.

11. A method of operating a Power-over-Ethernet network system as defined in claim 10, said method comprising:
    providing said sensor information indicating said ambient condition;
    transmitting said classification signal from said given powered device to said power sourcing equipment device via said communication link during said classification phase;
    interpreting, by said classification information receiving unit and during the classification phase, said classification signal as denoting said power consumption level of said given powered device;
    transmitting said classification signal from said given powered device to said power sourcing equipment device via said communication link during said second phase; and
    interpreting, by said sensor information retrieving unit during said second phase, said classification signal as denoting said sensor information indicating the ambient condition detected by the sensor of the given powered device.

12. A method of operating a powered device comprising a sensor unit for receiving power via a communication link, said method comprising:
    providing a classification signal to said communication link during a classification phase of said powered device, wherein said classification signal denotes a power consumption level of said powered device during the classification phase and is based on a power consumption of the powered device;

providing said classification signal to said communication link during a second phase, wherein said classification signal, during the second phase, denotes sensor information indicating an ambient condition detected by the sensor unit.

13. A non-transitory computer readable medium comprising a code of instructions that, when executed by a computer, cause the computer to perform the method of 12.

14. A method of operating a power sourcing equipment device for supplying power via a communication link to one or more powered devices, said method comprising:
- receiving a classification signal via said communication link from a given powered device of the one or more powered devices during a classification phase;
- interpreting, during the classification phase, said classification signal as denoting a power consumption level of said given powered device;
- receiving said classification signal from the given device during a second phase via said communication link; and
- interpreting, during the second phase, said classification signal as denoting sensor information indicating an ambient condition detected by a sensor of the powered device.

* * * * *